Figure 9:
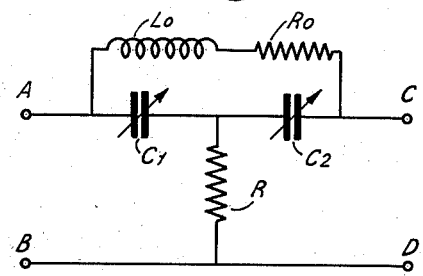
Figure 13:
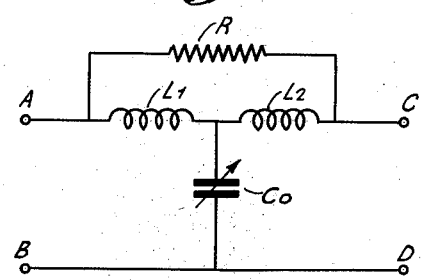

Sept. 21, 1937.  B. D. H. TELLEGEN  2,093,665
STAR AND DELTA CONNECTION OF IMPEDANCES
Filed Jan. 27, 1934  3 Sheets-Sheet 1
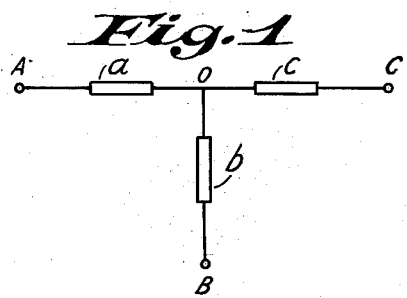
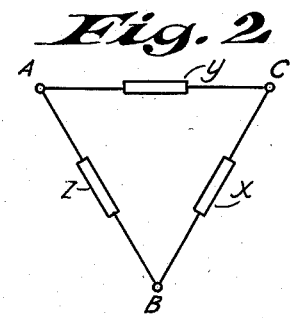
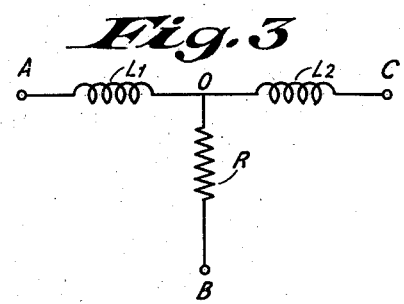
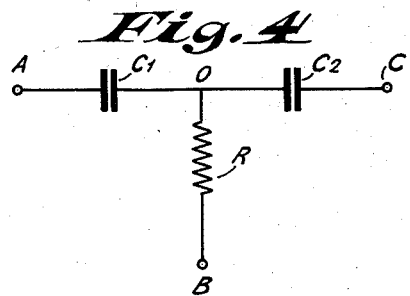
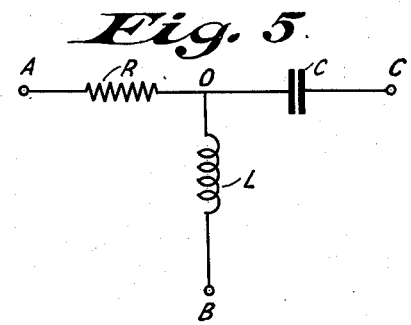
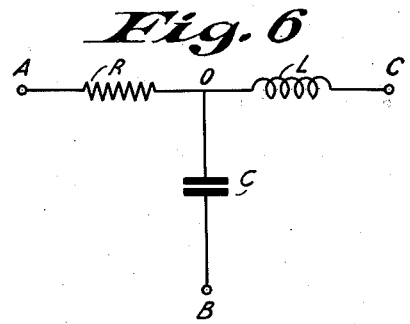
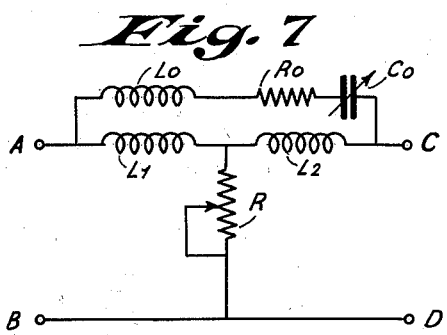
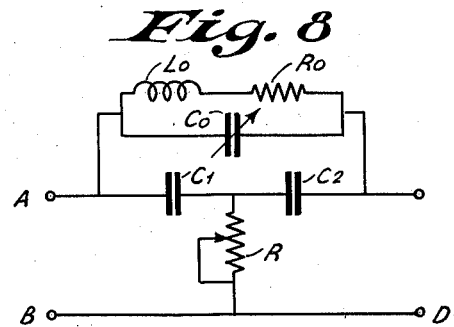
INVENTOR
BERNARDUS D.H. TELLEGEN
BY
ATTORNEY

INVENTOR
BERNARDUS D.H.TELLEGEN
BY
ATTORNEY

Sept. 21, 1937.  B. D. H. TELLEGEN  2,093,665
STAR AND DELTA CONNECTION OF IMPEDANCES
Filed Jan. 27, 1934   3 Sheets-Sheet 3

INVENTOR
BERNARDUS D.H. TELLEGEN
BY
ATTORNEY

Patented Sept. 21, 1937

2,093,665

UNITED STATES PATENT OFFICE 2,093,665

STAR AND DELTA CONNECTION OF IMPEDANCES

Bernardus Dominicus Hubertus Tellegen, Eindhoven, Netherlands, assignor to Radio Corporation of America, a corporation of Delaware Application January 27, 1934, Serial No. 708,683
In Germany January 30, 1933

11 Claims. (Cl. 178—44)

The invention relates to systems of impedances which are united in a suitable manner so as to form a star or delta-connected system in order to obtain between two terminals of the star-connected system or between one terminal of the delta-connected system and a point of the circuit of which the delta-connected system forms part, an impedance having a negative real or a positive or negative imaginary part.

There are known already devices such for example as electron discharge tubes (dynatrons) or gas discharge tubes, which have such a characteristic curve that with them a negative real alternating current resistance may be obtained. This property may be utilized for the generation of electrical oscillations because a member having such a resistance is capable of neutralizing either entirely or partly the positive resistance of an oscillatory circuit. If the resistance is entirely neutralized, the energy consumed in the oscillatory circuit must be supplied by the member with negative resistance so that the latter member acts as a source of energy.

So far in the present invention as impedances having a negative real part are concerned, this term does not include such negative resistances with which it is possible to make the total resistance of a circuit zero or negative. With the systems according to the invention it is possible, it is true, to obtain between two points of a circuit an impedance having a negative real part but the total resistance of the system always remains positive. These systems are therefore not suitable for generating electrical oscillations but they may be advantageously employed for the improvement of the properties of electric filter circuits.

The object of the invention is to unite impedances to a star-connected system so as to obtain between two star-points an impedance having a negative real part. Furthermore, the invention allows of uniting condensers or self-inductances and ohmic resistances to a star-connected system in such manner that the impedance between two star-points has the properties of a self-inductance or a capacity. According to the invention it is also possible to obtain the said properties with the aid of impedances in delta-connection.

For a better understanding of the invention reference is made to the following description taken in connection with the accompanying drawings, in which:

Figs. 1 to 13 and 18 to 20 show schematic circuit diagrams of circuits embodying the invention, and Figs. 14 to 17 are schematic circuit diagrams showing the invention applied to the input circuit of a radio receiver.

Figure 1 represents a star-connection A, B, C having impedances $a$, $b$, and $c$ which have no negative ohmic resistances, it is true, but for the rest may be constituted at will by self-inductance, capacity and ohmic resistance. Simple calculation shows that this star-connected system may be converted into an equivalent delta-connected one if the impedances $x$, $y$ and $z$ of the delta-connected system as shown in Figure 2 fulfill the following conditions (1) $$x = b + c + \frac{bc}{a}$$

(2) $$y = a + c + \frac{ac}{b}$$

(3) $$z = a + b + \frac{ab}{c}$$

With the aid of these expressions it is possible to calculate the impedances between the points A and B, A and C, B and C of the star-connected system. When starting from the simplest case that the impedances $a$, $b$ and $c$ are formed only by a single self inductance L, capacity C or ohmic resistance R, it is evident that $a$, $b$, and $c$ may be represented either by an imaginary value $$jwL \text{ or } \frac{1}{jwC}$$

or again by a real value R. As directly follows from the above-mentioned relations, one of the impedances $x$, $y$ or $z$ has in this case a negative real component only if one of the quotients $$\frac{bc}{a}, \frac{ac}{b}, \frac{ab}{c}$$

is a negative real value.

If for example it is desired that the impedance $y$ between the terminals A and C should have a negative real component, $$\frac{ac}{b}$$

must be negatively real.

If the impedances $a$, $b$ and $c$ are represented by the complex expressions $$a = |a|e^{i\phi_a} \quad b = |b|e^{i\phi_b} \quad c = |c|e^{i\phi_c}$$

($|a|$, $|b|$, and $|c|$ being the absolute values of $a$, $b$, and $c$) then $$\frac{ac}{b}$$

has a negative real value if $$\phi_a + \phi_c = \pm \pi + \phi_b$$

This condition may be fulfilled in different ways:

(1)  $\quad \phi_b = 0; \quad \phi_a = \phi_c = \frac{\pi}{2}$ i. e. the impedance $b$ is an ohmic resistance whereas $a$ and $c$ are self-inductances.

This system is represented in Fig. 3. For the impedance $y$ is obtained in this case the expression:

$$y = jw(L_1 + L_2) - \frac{w^2 L_1 L_2}{R}$$

It results from this expression that this impedance may be represented by the series connection of a self-inductance $L_1 + L_2$ and a negative resistance of the value $$\frac{w^2 L_1 L_2}{R}$$

which resistance is dependent on the frequency.

(2)  $\quad \phi_b = 0, \quad \phi_a = \phi_c = -\frac{\pi}{2}$ i. e. the impedance $b$ is an ohmic resistance whereas $a$ and $c$ are capacities as is shown in Figure 4. It results therefrom that in this case $y$ is determined by $$y = \frac{1}{jw}\left(\frac{1}{C_1} + \frac{1}{C_2}\right) - \frac{1}{w^2 C_1 C_2 R}$$

that is to say has a negative real component.

(3)  $\quad \phi_b = \frac{\pi}{2}, \quad \phi_a = 0, \quad \phi_c = -\frac{\pi}{2}$ This combination, in which $y$ is given by the expression $$y = \frac{1}{jwC} + R\left(1 - \frac{w_o^2}{w^2}\right)$$

is shown in Figure 5. It is evident that the real component of $y$ is negative in this case only when the natural frequency $$w_o^2 = \frac{1}{LC}$$

is larger than the frequency of the alternating currents circulating in the system.

(4)  $\quad \phi_b = -\frac{\pi}{2}; \quad \phi_a = 0; \quad \phi_c = \frac{\pi}{2}$ The latter possibility is shown in Figure 6. The impedance between the star-points A and C is determined in this case by the expression $$y = jwL + R\left(1 - \frac{w^2}{w_o^2}\right)$$

from which it results that the real part of $y$ becomes negative if the natural frequency $$w_o^2 = \frac{1}{LC}$$

is smaller than the frequency of the alternating voltages applied.

The same result may also be obtained of course by giving the impedances $a$, $b$ and $c$ more complicated composition. We will however not go further into that although these systems also fall under the invention.

The system according to the invention may be employed with advantage in combination with electric filters in order to neutralize the ohmic resistance of the coils employed and thus to improve certain properties of these filters.

Figure 7 represents by way of example a combination of a star-connected system according to Figure 3 with a system consisting of a self inductance $L_0$, a variable capacity $C_0$ and an ohmic resistance $R_0$ (the latter may be the resistance of the coil $L_0$ itself). Simple calculation shows that the impedance between the terminals A and C may become infinitely high. This case occurs if $$w^2 = \frac{1}{(L_o + L_1 + L_2)C_o}$$

and $$w^2 = \frac{L_1 L_2}{RR_o}$$

If these conditions are fulfilled by correctly dimensioning the elements of the system for a given frequency, there occurs for this frequency no transmission of energy at all from the terminals AB to the terminals CD but higher and lower frequencies may be transmitted.

Figure 10:
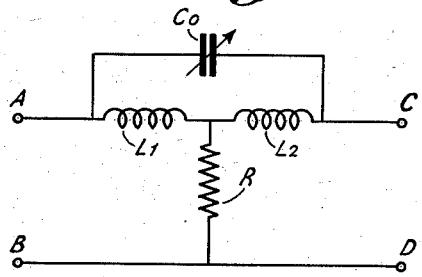

The system shown in Figure 8 and the systems of Figures 9 and 10 which are still better suitable for practical use possess properties similar to those of the system according to Figure 7.

The systems represented in Figures 7, 8, 9 and 10 may for example be employed with advantage if it is desired to suppress an alternating current of determined frequency but to transmit alternating currents of other frequency. This case occurs with wireless receiving installations if a determined disturbing transmitter has to be suppressed. In this case it is advantageous to dimension the impedances of the star-connected system in such manner that the tuning of the resonance circuit whose damping is reduced by means of the star-connected system is influenced as little as possible in order to be enabled to adjust both the tuning and the damping in the simplest possible manner. With the systems represented in Figures 7, 8, 9 and 10 the correct adjustment of the damping may occur in the simplest manner by altering the ohmic resistance R as shown in Figs. 7 and 8.

In the foregoing there have been considered star connections of impedances individually as well as in combination with other impedances, for example with tuned circuits. It is evident, however, that as star connection and delta connection are in dual relation to one another it is also possible to obtain with the delta-connected system similar results as with the star-connected system. For the conversion of the delta-connected into the star-connected system apply in this case the same relations 1, 2 and 3 if $a$, $b$, $c$, $x$, $y$, $z$, denote the admittances. A few delta-connected systems according to the invention are represented, by way of example, in Figures 11, 12 and 13 in which the star-connected systems are formed by impedances $RC_1C_2$ or $RL_1L_2$.

Furthermore, in connection with the above it may also be observed that with the systems in which self-inductances are connected into at least two branches, these self-inductances may also be mutually coupled. In the case of a coupling between the branches of the star- or delta-connected system the relations valid for the conversion of the star-connection into the delta-connection and conversely assume a more complicated form. It may be shown, however, that in this case there may also occur in the conversion impedances having a negative real part.

Figure 15:
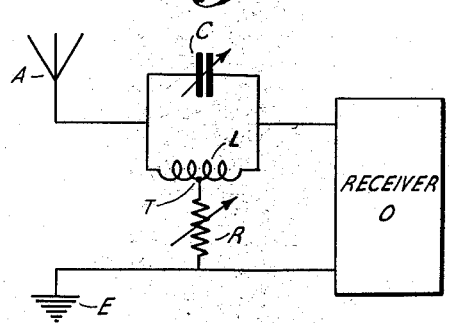
Figure 12:
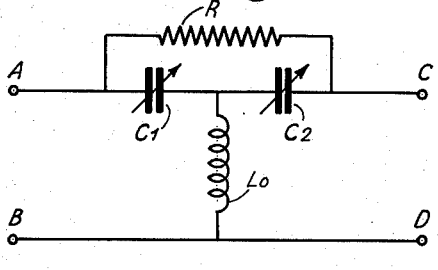
Figure 17:
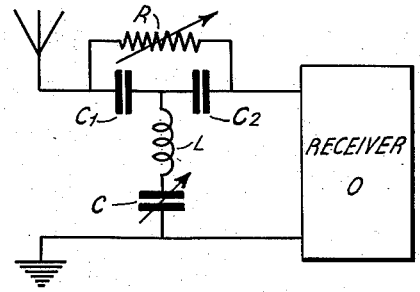

Examples of a practical application of the systems according to the invention are shown in Figures 15 and 17.

Figure 14:
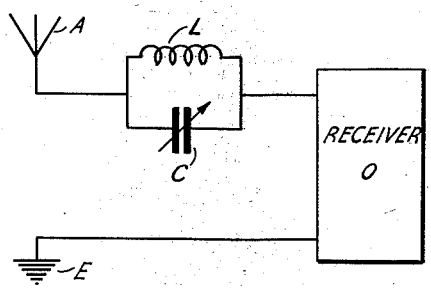
Figure 11:
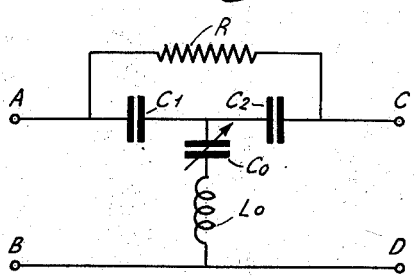

A known system for the suppression of a disturbing transmitter in wireless receiving installations is shown in Figure 14 in which one of the input terminals of a receiving apparatus O is connected to an antenna A with the interposition of a rejector circuit consisting of a coil L and of a condenser C whereas the other input terminal of the receiver is earthed at E. The losses in the condenser C and in the coil L cause a certain damping of the rejector circuit so that the disturbing transmitter may be suppressed partly although not completely. A complete suppression of the disturbing transmitter is rendered possible by the systems according to the invention, for which purpose the rejector circuit may be combined with a star-connected system so as to produce for example a system similar to that of Figure 8, 9 or 10. One of these possibilities is shown in Figure 15 in which the coil L of the rejector circuit is provided with a tap T which is connected to the earth E through a resistance R of variable value.

Figure 16:
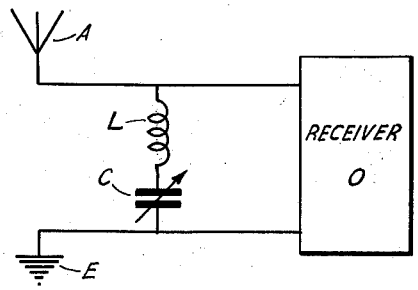

Another known system for suppressing a disturbing transmitter in wireless receiving installations is shown in Figure 16 in which a circuit consisting of the series connection of a coil L and of a condenser C is connected in parallel with the input terminals of a receiver O. With this system, too, it is impossible completely to suppress the disturbing transmitter. Use may be made in this case of a delta-connected system according to the invention as is shown in Figure 17 in which the delta-connected system is formed by two condensers $C_1$ and $C_2$ and by a, if desired variable, resistance R. By a correct choice of the values of $C_1$, $C_2$, and R the result is obtained that for the frequency of the disturbing transmitter the input terminals of the receiver O are entirely short-circuited and the disturbing transmitter consequently completely suppressed, the losses of the tuned circuit LC being compensated for by the delta-connected circuit.

Further examination of the Equations 1, 2 and 3 shows that with a star-connected system comprising only ohmic resistances and capacities it is possible to obtain between two star-points an impedance possessing the properties of a self-inductance having some resistance.

Figure 18:
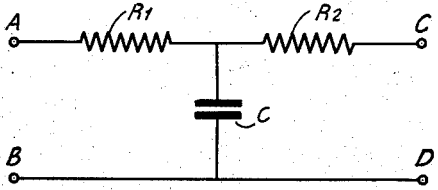

If, for example, it is desired that the impedance $$y = a + c + \frac{ac}{b}$$

between the terminals A and C of the star-connected system according to Figure 1 should possess these properties, this will be found to be only possible if for $a$ and $c$ are taken ohmic resistances and if for $b$ is taken an impedance consisting of capacity and resistance or a capacity. The latter possibility is shown in Figure 18. For the impedance $y$ between the terminals A and C in Figure 18 is found $$y = R_1 + R_2 + jwCR_1R_2$$

It results therefrom that this impedance behaves as a self-inductance $CR_1R_2$ having a resistance $R_1 + R_2$.

Figure 19:
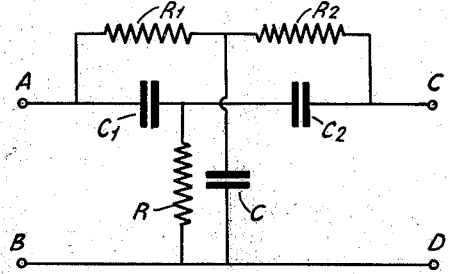

The star-connected system of Figure 18 may be combined with a star-connected system as shown, for example, in Figure 4, which gives a system according to Figure 19 which although being formed only by condensers and resistances, possesses nevertheless properties which otherwise may be obtained only with circuits consisting of self-inductance and capacity. This is clear without any further explanation when considering that the impedance between the points A and C of the system represented in Figure 4 after conversion into a delta-connected system may be represented by a series connection of a capacity and of a negative resistance so that the impedance between the points A and C in Figure 19 may be taken as a parallel connection of two branches of which one consists of a series connection of a self-inductance and a resistance whereas the other consists of a series connection of a capacity and a negative resistance. With such a system and with a suitable choice of the resistance and the condensers it is thus possible completely to suppress a determined frequency.

It is likewise possible with a star-connected system having only ohmic resistances and self-inductances, to obtain between two star-points an impedance having the properties of a capacity with a resistance connected in series therewith.

Figure 20:
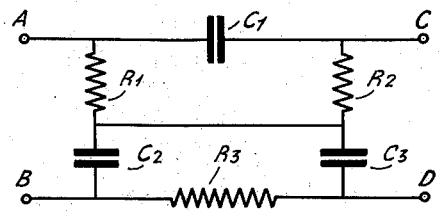

In this case all that has been said about star-connected systems also applies in a similar dual manner to a delta-connected system. An example of such a delta-connected system is shown in Figure 20.

Having described my invention, what I claim as new and desire to secure by Letters Patent is:

1. An electrical system of at least three star connected impedances each of which has a positive value, two of said impedances being so chosen and related to the third that their product divided by that of the third is a negative real quantity.

2. An electrical system comprising at least three star connected impedances each of which has a positive value, two of said impedances being so chosen and related to the third that their product divided by that of the third has a negative imaginary value.

3. An electrical system comprising at least two inductors and a resistor connected as three arms in star formation, the product of the impedances of two of said arms divided by that of the third arm being a negative real quantity.

4. An electrical system comprising at least two condensers and a resistor connected as three arms in star formation, the product of the impedance of two of said arms divided by that of the third arm being a negative real value.

5. Means for filtering out currents of an undesired frequency from currents covering a band of frequencies, comprising the combination of a coil, a condenser shunted across said coil, and a resistor connected to an intermediate point of said coil to form a star connected circuit, the product of the impedances of said divided coil sections divided by the impedance of said resistor being a negative real quantity.

6. The arrangement of claim 5 in which said condenser is adjustable to shift the position of said undesired frequency within said band and said resistor is variable to control the phase relations between the currents in said coil sections.

7. An electrical system comprising two coils inductively coupled together, a resistor connected to said coils to provide a circuit having at least three arms, the product of the impedances of two of said arms divided by that of the third arm being a negative real quantity.

8. An electrical network comprising at least two inductors and a resistor connected as three arms in star formation, the product of the impedances of two of said arms divided by that of the third arm being a negative real quantity and a resonant circuit connected across the ends of said inductors.

9. An electrical system comprising a resistor, a coil and a condenser connected as three arms in star formation, input terminals connected to the outer ends of two of said arms for applying signal currents of a predetermined frequency to said system, said coil and condenser being so designed as to form a circuit whose resonant frequency is greater than the frequency of said signal currents and the product of the impedances of two of said arms divided by the impedance of the third being a negative real quantity.

10. An electrical system consisting of at least three impedances each of which has a positive value, said impedances being connected together in delta formation, two of said impedances being so chosen and related to the third that their product divided by that of the third is a negative real quantity.

11. An electrical filter system comprising the combination of two substantially equal coils connected in series and inductively coupled together, a resistor having one end connected to the common terminal of said coils to form a three arm star connection, the product of the impedances of two of said arms divided by that of the third arm being a negative real quantity and means for changing the value of said resistor.

BERNARDUS DOMINICUS
HUBERTUS TELLEGEN.